(12) United States Patent
Kim et al.

(10) Patent No.: US 7,973,510 B2
(45) Date of Patent: Jul. 5, 2011

(54) APPARATUS FOR CONTROLLING INVERTER

(75) Inventors: Sun Ja Kim, Seoul (KR); Jeong Ha Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 441 days.

(21) Appl. No.: 12/343,339

(22) Filed: Dec. 23, 2008

(65) Prior Publication Data

US 2009/0167235 A1 Jul. 2, 2009

(30) Foreign Application Priority Data

Dec. 28, 2007 (KR) .................. 10-2007-0139818

(51) Int. Cl.
*H02P 27/06* (2006.01)

(52) U.S. Cl. .................. 318/801; 318/471; 318/472

(58) Field of Classification Search .................. 318/801, 318/471, 472, 599; 360/77.13
See application file for complete search history.

(56) References Cited

U.S. PATENT DOCUMENTS

| 5,760,988 | A | * | 6/1998 | Abe et al. .................. 360/73.11 |
| 6,104,567 | A | * | 8/2000 | Abe et al. .................. 360/77.13 |
| 7,504,796 | B2 | * | 3/2009 | Ichihara .................. 318/801 |
| 2007/0205742 | A1 | * | 9/2007 | Ichihara .................. 318/801 |

* cited by examiner

*Primary Examiner* — Paul Ip
(74) *Attorney, Agent, or Firm* — Lee, Hong, Degerman, Kang & Waimey

(57) ABSTRACT

The apparatus for controlling an inverter is disclosed which detects a rotation angle of a load using a current supplied to the load when the inverter utilizes a voltage/frequency control to control the driving of the load, and accurately drives the load using the detected rotation angle, where the current supplied to the load by the inverter is detected by a current sensor, and a rotation speed of the load is estimated by the detected current to be used for the driving of the load.

6 Claims, 4 Drawing Sheets

APPARATUS FOR CONTROLLING INVERTER

CROSS-REFERENCE TO RELATED APPLICATION

The present application is based on, and claims priority from, Korean Application Numbers 10-2007-0139818, filed Dec. 28, 2007, the disclosure of which is incorporated by reference herein in its entirety.

BACKGROUND

The present disclosure relates to an apparatus for controlling inverter, and more particularly to an apparatus for controlling an inverter capable of detecting a rotation angle of a load when controlling the load using a voltage/frequency control method, and controlling the load in response to the detected rotation angle.

An inverter is an electronic circuit for converting alternating current (AC) to direct current (DC), switching the converted DC voltage using switching elements such as transistors and IGBTs (Insulated Gate Bipolar Transistors), converting again to AC voltage, supplying the converted AC voltage to a load and driving the load. The inverter may adjust a switching gap of the switching elements to enable a user to drive the load using a desired frequency.

The inverter may be classified into a converter unit, an inverter unit and a controller according to respective operations.

The converter unit may include a three-phase rectifying circuit and a smoothing circuit, where a three-phase AC voltage is rectified by the three-phase rectifying circuit for conversion into a pulsating voltage, and the pulsating voltage is smoothed by the smoothing circuit to be converted to a DC voltage having a relatively low amount (small) of residual pulsation, or ripple.

The inverter unit serves to switch the DC voltage converted by the converter unit using switching elements (e.g., the transistors and IGBTs) and convert to an AC voltage. The inverter unit then supplies the converted AC voltage to a load and drives the load. A frequency of the AC voltage converted by the inverter unit may be adjusted in response to a switching speed of the switching element.

The controller that includes an arithmetic circuit, a detection circuit and a driving circuit may perform a switching control of the inverter unit, a voltage control of the converter unit and various operations for protection functionality.

The inverter unit employs a conventional voltage/frequency control method in controlling a load drive without detecting a driving speed of a load using a speed detection sensor such as an encoder and the like. The voltage/frequency control method may adjust a voltage supplied to a load to controllably drive the load using a frequency desired by a user.

In case a momentary power failure occurs in a state where an inverter drives an electric motor using the voltage/frequency control method, the electric motor is operated on a free run state. In case the power is supplied to allow an inverter to drive the electric motor again using the voltage/frequency control method in a state where the electric motor is driven on the free run state, the inverter may supply to the electric motor a voltage that is not consistent with a current rotation speed of the electric motor, whereby an over-current may flow to the inverter to damage the electric motor.

Accordingly, there is a need of searching for a speed of the electric motor for protection of the electric motor in case the momentary power failure occurs while the electric motor is driven by the voltage/frequency control method.

SUMMARY

The disclosure is conceived to overcome these problems, and aims to provide an apparatus for controlling an inverter capable of detecting a rotation angle of an electric motor to allow the inverter to controllably and stably drive a load using the detected rotation angle.

The apparatus for controlling an inverter according to the present disclosure is configured in such a manner that a current sensor may detect a current supplied to a load by the inverter, and the detected current may be converted to a circulating current of a load by a circulating current converter. A rotation angle of the load may be estimated by the converted circulating current, and the estimated rotation angle of the load may be integrated and converted to a rotation speed. The converted rotation speed may be integrated again to detect a rotation angle of the load, whereby the detected rotation angle may be provided to the inverter to drive the load.

In one general aspect of the present disclosure, an apparatus for controlling an inverter may comprise: an integrator integrating an error speed that is calculated by subtracting a desired speed from a target speed; a decelerating/accelerating controller generating the desired speed for driving a load in response to an output signal from the integrator; a voltage/frequency converter converting the output signal from the decelerating/accelerating controller to a driving voltage; a current sensor detecting a current supplied to the load; a speed searcher detecting a rotation angle of the load using the current detected by the current sensor; and a Pulse Width Modulation (PWM) switching unit driving the load in response to the driving voltage converted by the voltage/frequency converter and the rotation angle of the load detected by the desired speed and the speed searcher.

Implementations of this aspect may include one or more of the following features.

The current sensor may be a current transformer.

The speed searcher may comprise: a circulating current converter converting a current detected by the current sensor to a circulating current; and a speed estimator detecting an actual rotation angle of the load by the circulating current converted by the circulating current converter and outputting the actual rotation angle to the PWM switching unit.

The speed estimator may comprise: a rotation angle estimator estimating a rotation angle of the load using the circulating current circulated by the circulating current converter; a speed converter converting the rotation angle of the load estimated by the rotation angle estimator to a rotation speed of the load; a rotation angle converter converting the rotation speed converted by the speed converter to an actual rotation angle of the load and outputting the converted actual rotation angle to the PWM switching unit.

The speed converter may be an integrator integrating the rotation angle of the load estimated by the rotation angle estimator and converting the integrated rotation angle to a rotation speed of the load.

The rotation angle converter may be an integrator integrating the rotation speed integrated by the speed converter and converting the integrated rotation speed to a rotation angle of the load.

BRIEF DESCRIPTION OF THE DRAWINGS

Hereinafter, implementations of the present disclosure are described in detail with reference to the accompanying drawings. The same reference symbols are used throughout to identify the same or corresponding elements in the drawings. The meaning of specific terms or words used in the specification and the claims should not be limited to the literal or commonly employed sense, but should be construed in accordance with the spirit and scope of the invention.

DETAILED DESCRIPTION

The following exemplary implementations disclosed herein are not to be construed as limiting of the present disclosure as they are intended merely as illustrative of particular implementations of the disclosure as enabled herein. For the purpose of clarity, technical material that is known in the technical fields related to the disclosure has not been described in detail so that the disclosure is not unnecessarily obscured. Many alternatives, modifications, and variations will be apparent to those skilled in the art.

Figure 1:
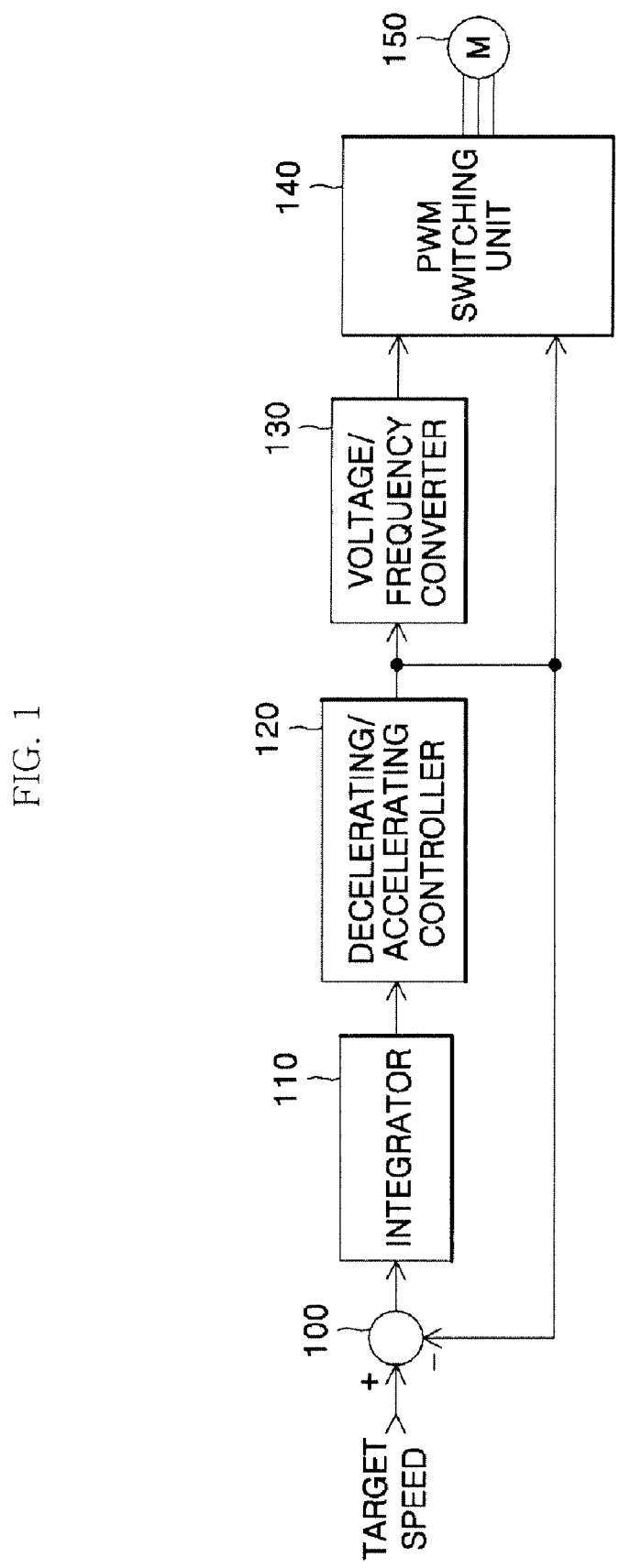
FIG. 1 is a block diagram illustrating a construction of conventional apparatus for controlling an inverter using a voltage/frequency control method.

FIG. 1 is a block diagram illustrating a construction of conventional apparatus for controlling an inverter using a voltage/frequency control method, wherein reference numeral 100 is a subtracter. The subtracter 100 serves to subtract a desired speed signal from a target speed signal to calculate an error speed signal. The error speed signal calculated by the subtracter 100 may be integrated by an integrator 110 and inputted into a decelerating/accelerating controller 120.

The decelerating/accelerating controller 120 may utilize the output signal from the integrator 110 to calculate a desired speed signal for driving a load 150, and the calculated desired speed signal may be inputted into the subtracter 100 and used for calculating the error speed signal.

The desired speed signal outputted by the decelerating/accelerating controller 120 may be inputted into a voltage/frequency converter 130 and a PWM (Pulse Width Modulation) switching unit 140. The voltage/frequency converter 130 may utilize a pre-stored voltage/frequency conversion table to convert a frequency of the desired speed inputted from the decelerating/accelerating controller 120 to a driving voltage, and output the converted driving voltage to the PWM switching unit 140.

The PWM switching unit 140 may PWM-control the load 150 in response to the driving voltage inputted from the voltage/frequency converter 130 and the desired speed inputted from the decelerating/accelerating controller 120, whereby the load 150 is driven at a target speed.

The PWM switching unit 140 may control the driving voltage of the load 150 and the desired speed at the same time to maintain an air-gap flux of the load to the target speed at a predetermined level.

Figure 2:
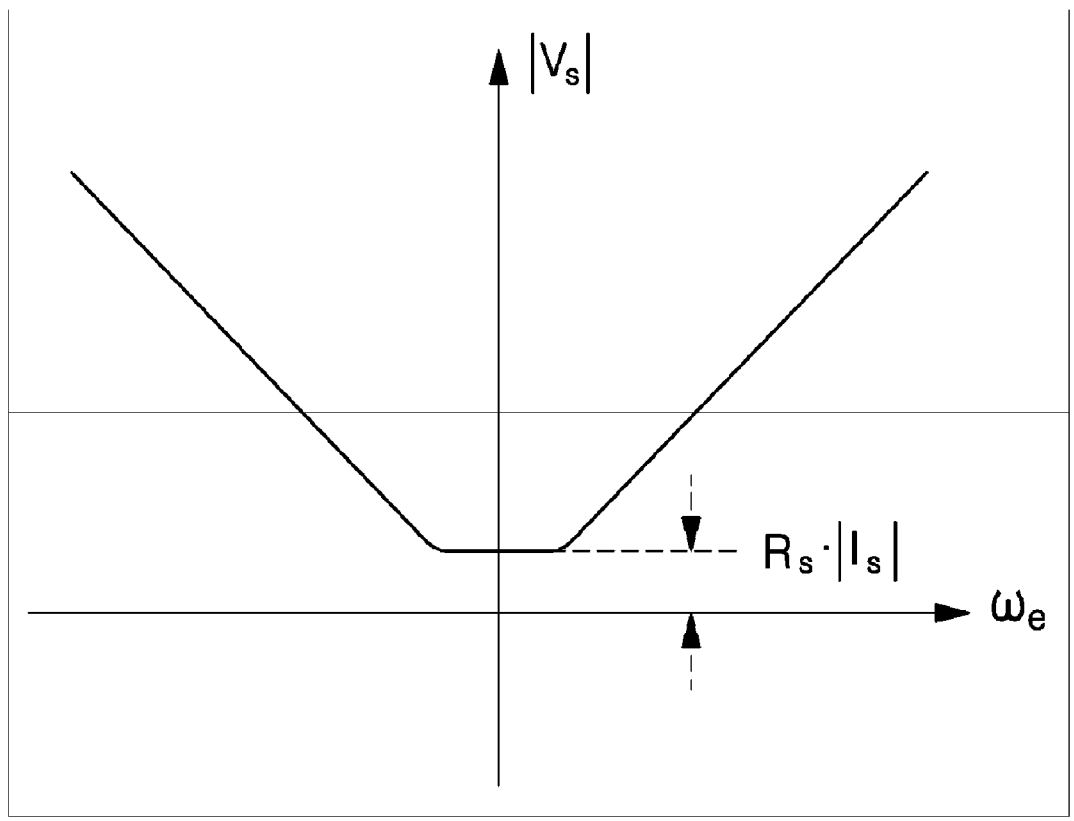
FIG. 2 is a graph illustrating a relationship between a stator voltage of an electric motor which is a load when controlling voltage and frequency and a desired speed of the load.

A relationship between a stator voltage (Vs) of an electric motor and the desired speed ($\omega_e$) is shown in a graph illustrated in FIG. 2 if the load 150 is the electric motor. That is, if the load 150 is the electric motor, a stator voltage of the electric motor for controlling voltage/frequency of the electric motor may be calculated by the following equation 1.

$$Vs = j\omega_e s\lambda_m + (Rs + jX_{1s})sIs \qquad \text{[Equation 1]}$$

where, Vs is a stator voltage of the electric motor, $\omega_e$ is a desired speed, Rs is a stator resistance of the electric motor, $X_{1s}$ is a leakage reactance and Is is a phase current of the electric motor. If the $\omega_e$ is large enough to be written as $$|\lambda_m|s\omega_e = |E_m| \gg |(Rs + jX_1s)sIs|,$$

the Equation 1 now reads as $$|Vs|(|\lambda_m|s\omega_e.$$

Accordingly, if the PWM switching unit 140 drives the load 150 of the electric motor in the following Equation 2, an air-gap flux $\lambda_m$ may be maintained at a constant level.

$$\left|\frac{Vs}{\omega_e}\right| = |\lambda_m| = const| \qquad \text{[Equation 2]}$$

If the air-gap flux of the electric motor is maintained at the predetermined level, the PWM switching unit 140 may control the voltage of the electric motor at a predetermined level and increase a driving speed, whereby the load 150 can be driven at a speed desired by a user.

However, if there is generated a momentary power failure in the above-mentioned apparatus for controlling inverter, power is supplied while the electric motor may be driven on a free run state, and if the inverter drives the electric motor again in the voltage/frequency control method, the PWM switching unit 140 may output a voltage that is not consistent with a current rotation speed of the electric motor which is in turn supplied to the electric motor, whereby an over-current flows to the PWM switching unit 140 and the PWM switching unit 140 as well as the electric motor are damaged by an unknown current.

Figure 3:
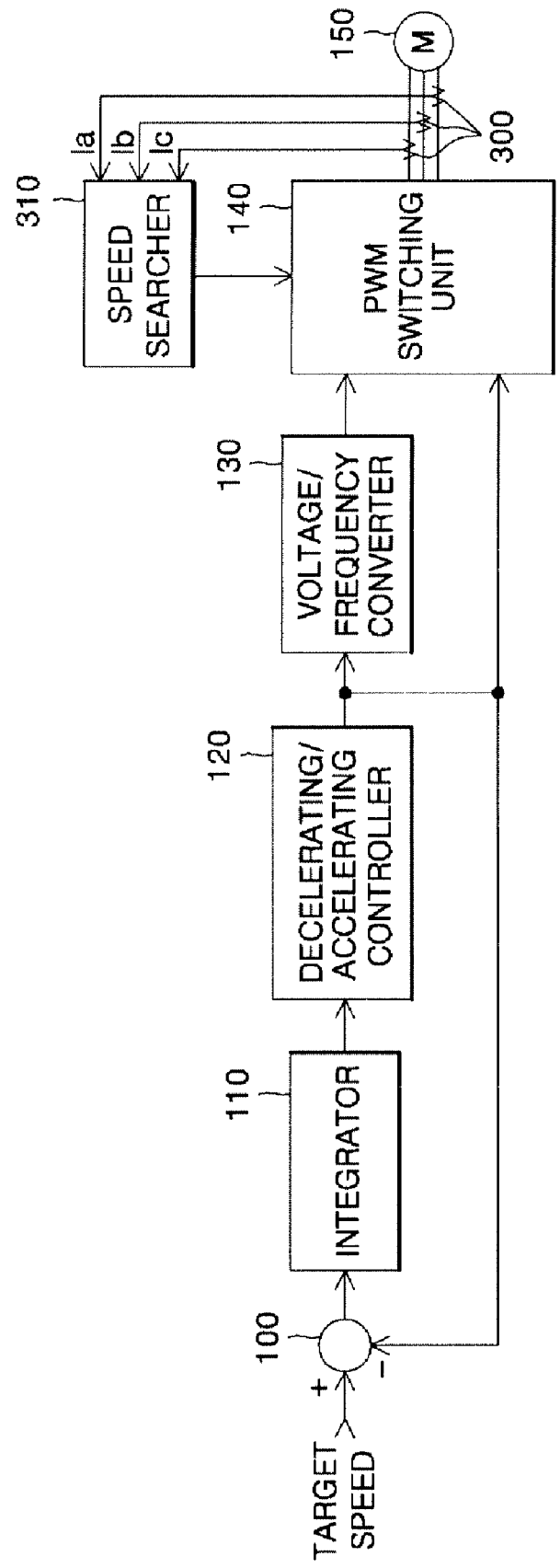
FIG. 3 is a block diagram illustrating a construction of an exemplary implementation of an apparatus for controlling an inverter.

FIG. 3 is a block diagram illustrating a construction of an exemplary implementation of an apparatus for controlling an inverter.

Referring to FIG. 3, the apparatus for controlling inverter including a subtracter 100, an integrator 110, a decelerating/accelerating controller 120, a voltage/frequency converter 130, a PWM switching unit 140 and a load 150 may further comprise: a current sensor (300. e.g., a current transformer) for detecting currents (Ia, Ib, Ic) supplied to the load 150 by the PWM switching unit 140; and a speed searcher 310 searching for a rotation speed of the load 150 by the currents (Ia, Ib, Ic) detected by the current sensor 300 and supplying the searched rotation speed to the PWM switching unit 140.

Figure 4:
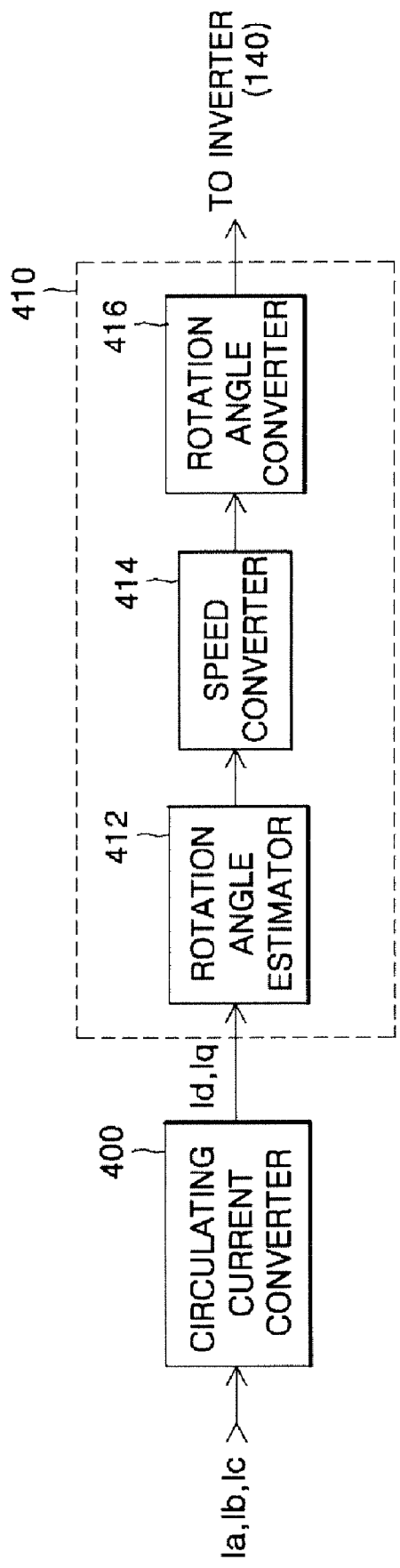
FIG. 4 is a block diagram illustrating a construction of an exemplary implementation of a speed searcher in an apparatus for controlling an inverter.

Now, referring to FIG. 4, the speed searcher 310 may include a circulating current converter 400 converting the currents (Ia, Ib, Ic) detected by the current sensor 300 to circulating currents (Id, Iq), and a speed estimator 410 detecting an actual rotation angle of the load 150 using the circulating currents (Id, Iq) converted by the circulating current converter 400 and outputting the actual rotation angle to the PWM switching unit 140.

The speed estimator 410 may include a rotation angle estimator 412 estimating a rotation angle of the load 150 using the circulating currents (Id, Iq) converted by the circulating current converter 400, a speed converter 414 converting the rotation angle of the load 150 estimated by the rotation angle estimator 412 to a rotation speed of the load 150, and a rotation angle converter 416 converting the rotation speed converted by the speed converter 414 to an actual rotation angle of the load 150 and outputting the actual rotation angle of the load 150 to the PWM switching unit 140.

The apparatus for controlling inverter thus configured according to the present disclosure is such that if the PWM switching unit 140 supplies the currents (Ia, Ib, Ic) to the load 150 and drives the load 150, the currents (Ia, Ib, Ic) supplied to the load 150 by the PWM switching unit 140 are detected by the current sensor 300 and inputted to the speed searcher 310. Successively, the circulating currents (Id, Iq) may be calculated using the currents (Ia, Ib, Ic) inputted by the circulating current converter 400 of the speed searcher 310. The circulating currents (Id, Iq) may be calculated, for example, by the following Equations 3 and 4.

$$|Id| = \frac{(2 \times Ia - Ib - Ic)}{3} \quad \text{[Equation 3]}$$

$$|Iq| = \frac{1}{\sqrt{3}}(Ib - Ic) \quad \text{[Equation 4]}$$

Once the circulating currents (Id, Iq) are calculated, the rotation angle estimator 412 of the speed estimator 410 may utilize the circulating currents (Id, Iq) to estimate a rotation angle of the load 150. Now, the estimation of the rotation angle of the load 150 will be described in detail.

Generally, a plurality of switching elements disposed at the three-phase PWM switching unit 140 includes a power semiconductor diode and an anti-parallel diode. If each of the three phases is fixed by a PWM output voltage, the electric motor which is substantially the load 150 is short-circuited. At this time, an induced voltage is generated due to residual flux in a rotor core of the electric motor. The induced voltage generates a circulating current between the PWM switching unit 140 and the load 150, where the generated circulating current may include frequency components. The circulating current may be expressed in trigonometric functions of the following Equations 5 and 6.

$$|\sin\theta| = \frac{Iq}{\sqrt{Id^2 + Iq^2}} \quad \text{[Equation 5]}$$

$$\left|\cos\theta = \frac{Id}{\sqrt{Id^2 + Iq^2}}\right| \quad \text{[Equation 6]}$$

Therefore, the rotation angle of the load 150 may be obtained according to the following Equation 7 using addition property of order of the trigonometric function.

$$|\sin(\theta - \hat{\theta})| = \sin\theta \times \cos\hat{\theta} - \cos\theta \times \sin\hat{\theta} \quad \text{[Equation 7]}$$

where, $\hat{\theta}$ is an estimated rotation angle.

If the rotation angle of the load 150 is estimated, the speed converter 414 may convert the estimated rotation angle to a rotation speed of the load 150. For example, the speed converter 414 as an integrator integrates the rotation angle of the load 150 estimated by the rotation angle estimator 412, and the integrated rotation angle of the load 150 is converted to a rotation speed of the load 150.

The converted rotation speed of the load 150 is converted to the rotation angle of the load 150 to be provided to the PWM switching unit 140. For example, the rotation angle converter 416 as an integrator integrates the rotation speed of the load 150 and converts the integrated rotation speed to a rotation angle of the load 150, provides the converted rotation angle of the load 150 to the PWM switching unit 140, where the PWM switching unit 140 controls the drive of the load 150 in response to the rotation angle of the load 150.

While the present disclosure is described herein with reference to illustrative implementations for particular applications, it should be understood that the disclosure is not limited thereto. Those having ordinary skill in the art and access to the teachings provided herein will recognize additional modifications, applications and implementations within the scope thereof and additional fields in which the present disclosure would be of significant utility. The scope of the disclosure is limited only by the claims and equivalents thereof.

What is claimed is:

1. An apparatus for controlling an inverter comprising: an integrator integrating an error speed that is calculated by subtracting a desired speed from a target speed; a decelerating/accelerating controller generating the desired speed for driving a load in response to an output signal from the integrator; a voltage/frequency converter converting the output signal from the decelerating/accelerating controller to a driving voltage; a current sensor detecting a current supplied to the load; a speed searcher detecting a rotation angle of the load using the current detected by the current sensor; and a Pulse Width Modulation (PWM) switching unit driving the load in response to the driving voltage converted by the voltage/frequency converter and the rotation angle of the load detected by the desired speed and the speed searcher.

2. The apparatus of claim 1, wherein the current sensor is a current transformer.

3. The apparatus of claim 1, wherein the speed searcher comprises: a circulating current converter converting a current detected by the current sensor to a circulating current; and a speed estimator detecting an actual rotation angle of the load by the circulating current converted by the circulating current converter and outputting the actual rotation angle to the PWM switching unit.

4. The apparatus of claim 3, wherein the speed estimator comprises: a rotation angle estimator estimating a rotation angle of the load using the circulating current circulated by the circulating current converter; a speed converter converting the rotation angle of the load estimated by the rotation angle estimator to a rotation speed of the load; a rotation angle converter converting the rotation speed converted by the speed converter to an actual rotation angle of the load and outputting the converted actual rotation angle to the PWM switching unit.

5. The apparatus of claim 4, wherein the speed converter is an integrator integrating the rotation angle of the load estimated by the rotation angle estimator and converting the integrated rotation angle to a rotation speed of the load.

6. The apparatus of claim 4, wherein the rotation angle converter is an integrator integrating the rotation speed integrated by the speed converter and converting the integrated rotation speed to a rotation angle of the load.

* * * * *

UNITED STATES PATENT AND TRADEMARK OFFICE
CERTIFICATE OF CORRECTION

| | | |
|---|---|---|
| PATENT NO. | : 7,973,510 B2 | Page 1 of 1 |
| APPLICATION NO. | : 12/343339 | |
| DATED | : July 5, 2011 | |
| INVENTOR(S) | : Sun Ja Kim and Jeong Ha Kim | |

It is certified that error appears in the above-identified patent and that said Letters Patent is hereby corrected as shown below:

Title Page, Item (73) should be as follows:

-- (73) Assignee: LS Industrial Systems Co., Ltd., Anyang-si (KR) --.

Signed and Sealed this
Ninth Day of August, 2011

David J. Kappos
*Director of the United States Patent and Trademark Office*